(12) United States Patent
Tatsuda

(10) Patent No.: US 8,544,363 B2
(45) Date of Patent: Oct. 1, 2013

(54) CLAMP DEVICE FOR ROTATION INDEXING APPARATUS FOR MACHINE TOOL

(75) Inventor: Yoshinori Tatsuda, Kanazawa (JP)

(73) Assignee: Tsudakoma Kogyo Kabushiki Kaisha, Kanazawa-shi, Ishikawa-ken (JP)

( * ) Notice: Subject to any disclaimer, the term of this patent is extended or adjusted under 35 U.S.C. 154(b) by 559 days.

(21) Appl. No.: 12/665,964

(22) PCT Filed: Jul. 9, 2008

(86) PCT No.: PCT/JP2008/062394
§ 371 (c)(1),
(2), (4) Date: Dec. 22, 2009

(87) PCT Pub. No.: WO2009/008444
PCT Pub. Date: Jan. 15, 2009

(65) Prior Publication Data
US 2010/0319487 A1     Dec. 23, 2010

(30) Foreign Application Priority Data
Jul. 12, 2007   (JP) ................................. 2007-183315

(51) Int. Cl.
*B23Q 16/10*    (2006.01)
(52) U.S. Cl.
CPC ............ *B23Q 16/102* (2013.01); *B23Q 16/105* (2013.01)
USPC ..................................... 74/813 L; 74/813 R
(58) Field of Classification Search
USPC ................ 74/813 L, 813 C, 813 R, 816, 817, 74/822, 823, 824; 188/17, 18 A, 170, 171
See application file for complete search history.

(56) References Cited

U.S. PATENT DOCUMENTS

| | | | |
|---|---|---|---|
| 3,941,014 A * | 3/1976 | Benjamin et al. | ............... 74/826 |
| 5,239,892 A | 8/1993 | Sakai | |

FOREIGN PATENT DOCUMENTS

| | | | |
|---|---|---|---|
| DE | 4128276 A1 | | 3/1992 |
| JP | 6-155231 A | | 6/1994 |
| JP | 06024833 U | * | 6/1994 |
| JP | 7-266169 A | | 10/1995 |
| JP | 8-294835 A | | 11/1996 |
| JP | 2002-018679 A | | 1/2002 |
| JP | 2006-095668 A | | 4/2006 |

OTHER PUBLICATIONS

Machine translation of JP06024833U, generated by JPO online machine translation service, Oct. 24, 2012.*
European Search Report of EP Application No. 08778003.7, mailing date of Apr. 4, 2011.
International Search Report of PCT/JP2008/062394, mailing date of Aug. 26, 2008.

* cited by examiner

*Primary Examiner* — Richard W Ridley
*Assistant Examiner* — Richard Urbanski
(74) *Attorney, Agent, or Firm* — Westerman, Hattori, Daniels & Adrian, LLP

(57) ABSTRACT

Intended is to unitize a clamp device for a rotation indexing apparatus for a machine tool, thereby facilitating the maintenance of the clamp device and the assembly of the indexing apparatus including the clamp device. The rotation indexing apparatus (1) for the machine tool comprises the clamp device (2) for clamping a clamp disc (11) by causing a clamp element (6) to exert a pressing force on the clamp disc (11), thereby to bring a rotary drive target member (4) such as a circular table into a clamped state. Of the individual members constituting the clamp device (2), the individual major members excepting the clamp device (11) to be mounted on a rotating shaft (5) are unitized.

3 Claims, 3 Drawing Sheets

CLAMP DEVICE FOR ROTATION INDEXING APPARATUS FOR MACHINE TOOL

TECHNICAL FIELD

The present invention relates to a clamp device for a rotation indexing apparatus, such as a rotary table apparatus, used in a machine tool.

BACKGROUND ART

Patent Document 1 and Patent Document 2 disclose a rotary table apparatus (rotation indexing apparatus) for a machine tool including a disc-type clamp device. In the disc-type clamp device, a table (rotary drive target member) is fixed to a spindle (rotating shaft), and a clamp disc is attached to the rotating shaft such that the clamp disc cannot rotate with respect to the rotating shaft. The clamp disc is pressed against a housing by a piston member so that the clamp disc is clamped between the housing and the piston member. Thus, the clamp disc is clamped in a non-rotatable manner and rotation of the rotating shaft is stopped.

According to the technique described in Patent Document 1, a ring-shaped (donut-shaped) space is formed between the housing (frame body) and a cylinder element (front-face plate) fixed to an end face of the housing, and a piston is guided by the space such that the piston is slidable in an axial direction of the rotating shaft. In addition, according to the technique described in Patent Document 2, a ring-shaped space is formed in a cylinder element (cylinder), and a piston is guided by the space such that the piston is slidable in an axial direction of the rotating shaft.

In the technique according to the related art disclosed in Patent Document 1, the space which is formed in the cylinder element or between the cylinder element and the housing and in which the piston member is fitted simply guides the piston element in the axial direction of the rotating shaft, and is open at one side thereof in the sliding direction of the piston member. More specifically, when the cylinder element is detached from the housing, the piston member either remains in the housing or falls off from the cylinder element. Therefore, it is not possible to detach the entire body of the clamp device as a unit. In this structure, when it becomes necessary to perform maintenance for the clamp device, for example, when it becomes necessary to replace a worn piston member with another one and the clamp device is to be detached from the rotary table apparatus, each member of the clamp device must be detached individually. Thus, cumbersome processes are necessary. In addition, in the case where, for example, the clamp disc (brake plate), which is positioned deeper in the apparatus than the clamp device, is to be replaced with another one, the following processes are performed. That is, first, each member of the clamp device is individually detached from the rotary table apparatus. Then, the clamp disc is replaced with another one, and the clamp device is reassembled and attached to the rotary table apparatus again. Thus, maintenance cannot be easily performed.

In the structure according to the related art described in Patent Document 2, compression springs (springs) for returning the piston member from the clamped state to the original state is placed between the housing and the piston (in the main body of the rotary table apparatus). Therefore, it is not possible to detach the entire body of the clamp device as a unit. More specifically, when the clamp device is detached from the main body of the rotary table apparatus, the main component used in the clamping operation remains in the main body of the rotary table apparatus. Therefore, the assembly state of the clamp device cannot be reestablished, and the clamp device cannot be used as an independent unit. This will be a problem when, in particular, operation tests (performance tests) of the clamp device are performed before the clamp device is attached to the rotary table apparatus.

Patent Document 1: Japanese Unexamined Patent Application Publication No. 2006-95668

Patent Document 2: Japanese Unexamined Patent Application Publication No. 06-155231

DISCLOSURE OF INVENTION

Problems to be Solved by the Invention

Therefore, an object of the present invention is to unitize a clamp device for a rotation indexing apparatus for a machine tool, thereby facilitating the maintenance of the clamp device and the assembly of the indexing apparatus including the clamp device.

Means for Solving the Problems

To achieve the above-described object, according to the present invention, a clamp device (2) is structured such that when the clamp device (2) is detached from a rotation indexing apparatus (1), major members of the clamp device (2) except a clamp disc (11), which is attached to a rotating shaft (5), can be detached together as a unit. More specifically, in a rotation indexing apparatus (1) for a machine tool including a rotating shaft (5) which is rotatably provided in a housing (3) and to which a rotary drive target member (4) is fixed at an end of the rotating, shaft (5), a clamp disc (11) which is attached to the rotating shaft (5) such that the clamp disc (11) is not rotatable with respect to the rotating shaft (5), and the clamp device (2) which applies a pressing force to the clamp disc (11) and clamps the clamp disc (11) in cooperation with a clamp surface (12) of the housing (3), thereby setting the rotary drive target member (4) to a clamped state, the clamp device (2) includes a cylinder element (7) which is detachably fixed to an end face of the housing (3) of the rotation indexing apparatus (1) for the machine tool and in which a ring-shaped groove (34) centered on an axial line of the rotating shaft (5) is formed, a clamp element (6) which is inserted in the ring-shaped groove (34) in the cylinder element (7) in a slidable manner and which applies the pressing force to the clamp disc (11), an engagement element (8) which is fixed to the cylinder element (7) and which restricts sliding of the clamp element (6) in an axial direction of the rotating shaft (5), and a spring member (10) disposed between the clamp element (6) and the cylinder element (7) or between the clamp element (6) and the engagement element (8), the spring member (10) urging the clamp element (6) in a clamping direction or an unclamping direction.

According to the present invention, the clamp device (2) may be structure as a normally clamped type in which the cylinder element (7) is normally urged in the clamping direction by the spring member (10), and the engagement element (8) may include an engagement surface (14) which faces the end face (9) of the clamp element (6) and which is disposed at a position where the engagement surface (14) does not obstruct an operation of pressing the clamp disc (11) performed by the clamp element (6).

ADVANTAGES

According to the invention of claim 1, in a rotation indexing apparatus (1) for a machine tool including a clamp device (2), a rotary drive target member (4) is fixed to a rotating shaft (5), and the clamp device (2) clamps a clamp disc (11), which is attached to the rotating shaft (5) such that the clamp disc (11) is not rotatable with respect to the rotating shaft (5), and thereby sets the rotary drive target member (4) to a clamped state. The clamp device (2) includes a cylinder element (7) which is detachably fixed to an end face of the housing (3) of the rotation indexing apparatus (1) for the machine tool, a clamp element (6) which is provided in a ring-shaped groove (34) formed in the cylinder element (7) such that the clamp element (6) is slidable in an axial direction of the rotating shaft (5) and which applies a pressing force to the clamp disc (11), an engagement element (8) which is fixed to the cylinder element (7) and which restricts sliding of the clamp element (6) in the axial direction of the rotating shaft (5), and a spring member (10) disposed between the clamp element (6) and the cylinder element (7) or between the clamp element (6) and the engagement element (8), the spring member (10) urging the clamp element (6) in a clamping direction or an unclamping direction. Therefore, when the fixed state between the cylinder element (7) and the housing (3) is canceled and the cylinder element (7) is detached from the housing (3), since the engagement element (8) is provided, the clamp element (6) and the spring member (10) can be detached from the housing (3) together with the cylinder element (7) as a unit. In other words, the clamp device (2) can be detached from the main body of the rotation indexing apparatus (1).

In addition, according to the invention of claim 2, in the clamp device (2) of a normally clamped type in which the cylinder element (7) is normally urged in the clamping direction by the spring member (10), the engagement element (8) includes an engagement surface (14) which faces the end face (9) of the clamp element (6). Therefore, when the clamp device 2 is detached from the housing 3, the cylinder element (7), the clamp element (6), and the engagement element (8) can be detached from the housing (3) together in such a state that the end face (9) of the clamp element (6) which faces the clamp disc (11) is pressed against the engagement surface (14) of the engagement element (8) by the urging force applied by the spring member (10). In addition, since the clamp element (6) is pressed against the engagement surface (14) of the engagement element (8) by the urging force applied by the spring member (10), the clamp element (6) does not move freely and there is no risk that the work efficiency will be degraded by free movement of the clamp element (6). Here, the engagement surface (14) is disposed at a position where the engagement surface (14) does not obstruct the operation of pressing the clamp disc (11) performed by the clamp element (6). Therefore, in the state in which clamp device (2) is attached to the rotation indexing apparatus (1), the engagement surface (14) does not obstruct the clamping operation of the clamp device (2).

In addition, in the structure (normally unclamped type) in which the spring member (10) is provided between the clamp element (6) and the engagement element (8), the cylinder element (7), the clamp element (6), and the engagement element (8) can be detached from the housing (3) together in a state in which the clamp element (6) is pressed against the cylinder element (7) by the urging force applied by the spring member (10).

As described above, since the clamp device (2) can be detached from the housing (3) as a unit, the clamp device (2) can be easily detached from the rotation indexing apparatus (1). Therefore, the process of detaching the clamp device (2) for maintenance and the assembly of the rotation indexing apparatus (1) itself are facilitated. In addition, since the clamp device (2) can be detached as a unit, the maintenance process can also be facilitated. In addition, the assembly precision of the unit can be increased and operation tests (performance tests) of the clamp device can be performed individually before the assembly. As a result, the reliability can be increased.

Figure 1:
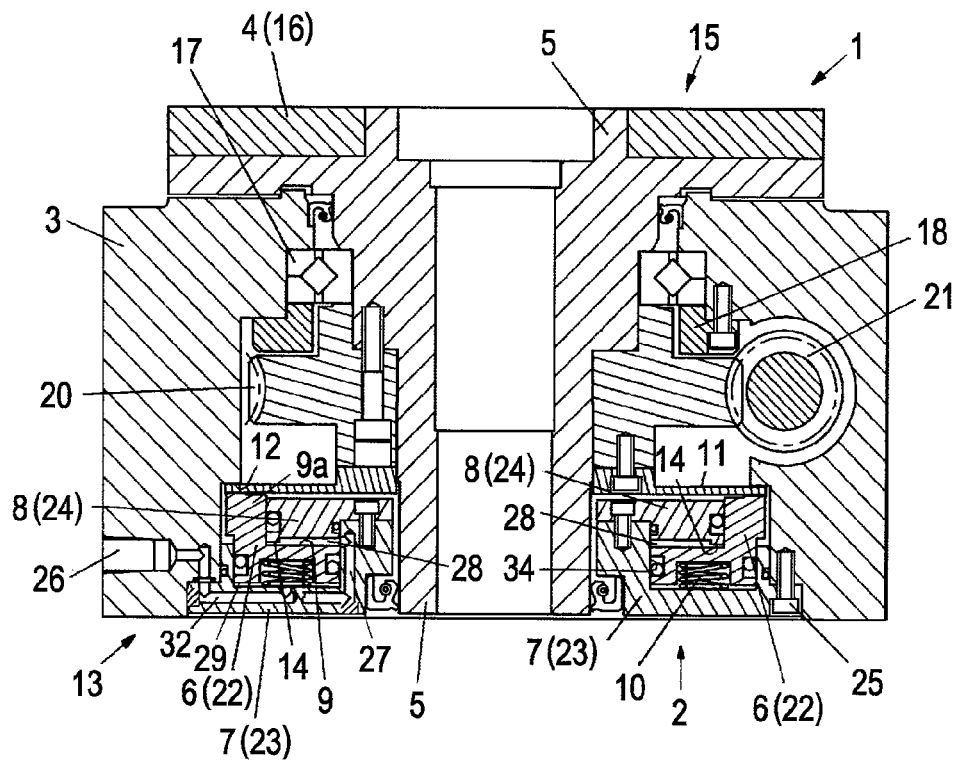
FIG. 1 is a sectional view illustrating the entire body of a rotation indexing apparatus 1.

REFERENCE NUMERALS 1 rotation indexing apparatus
2 clamp device
3 housing
4 rotary drive target member
5 rotating shaft
6 clamp element
7 cylinder element
8 engagement element
9 end face
9a pressing portion
10 spring member
11 clamp disc
12 clamp surface
13 unclamping means
14 engagement surface
15 rotary circular table apparatus
16 circular table
17 bearing
18 bearing sleeve
19 oil seal
20 worm wheel
21 worm gear
22 piston member
23 casing member
24 engagement member
25 screw members
26 fluid port
27 fluid path
28 pressure chamber
29 pressure chamber
30 pressure chamber
31 fluid path
32 fluid path
33 second clamping member
34 groove
35 bellows spring
36 stopper ring

BEST MODES FOR CARRYING OUT THE INVENTION

The present invention is applied to a rotation indexing apparatus for a machine tool used for indexing an angle of a workpiece.

FIG. 1 shows a rotary circular table apparatus 15 which functions as a rotation indexing apparatus 1 for a machine tool according to an embodiment of the present invention. The rotary circular table apparatus 15 is an apparatus in which a circular table 16, which functions as a rotary drive target member 4, is rotatably attached to a housing 3, which functions as a base. The rotary circular table apparatus 15 is also called an index table or a rotary table.

The rotary circular table apparatus 15 will be described in more detail. The circular table 16 is fixed to an end portion of a rotating shaft 5, which is rotatably provided in the housing 3. The rotating shaft 5 is rotatably supported by a bearing 17 which is fixed to the housing 3 with a bearing sleeve 18.

The rotary circular table apparatus 15 includes a worm wheel 20 fixed to the rotating shaft 5, a worm gear 21 which is rotatably supported in the housing 3 and which meshes with the worm wheel 20, and a motor (not shown) which rotates the worm gear 21. The worm wheel 20, the worm gear 21, and the motor function as drive means for the circular table 16. In this example, the worm gear mechanism is used as the drive means for the circular table 16. However, a DD motor (direct (direct-drive-type) drive motor) may also be used as the drive means (drive source) as in the above-described structure of the related art.

The circular table 16 is fixed to the rotating shaft 5 at one end thereof, and a clamp device 2, which is a characteristic part of the present invention, is detachably attached to the housing 3 at the other end of the rotating shaft 5. The clamp device 2 applies a pressing force to a clamp disc 11, which is attached to the rotating shaft 5 such that the clamp disc 11 cannot rotate with respect to the rotating shaft 5, and thereby clamps the clamp disc 11 in cooperation with a clamp surface 12 of the housing 3 to set the circular table 16 in a clamped state. The clamp device 2 is a hydraulic cylinder.

In general, there are two types of clamp devices: a normally clamped type and a normally unclamped type. In the normally clamped type, a clamp member is normally urged against the clamp disc by a spring or the like so that the clamp disc is normally clamped, and the clamp member is moved away from the clamp disc by hydraulic pressure or the like to release the clamp disc only when an indexing operation is performed. In the normally unclamped type, the clamp member is normally separated from the clamp disc so that the clamp disc is released, and the clamp member is urged against the clamp disc by hydraulic pressure or the like in a clamping operation to clamp the clamp disc. Although the present invention is applicable to both types of clamp devices, an example in which the present invention is applied to a clamp device of the normally clamped type is explained in the present embodiment.

The clamp device 2 includes a piston member 22 which functions as a clamp element 6 and which presses the clamp disc 11; a casing member 23 which functions as a cylinder element 7 and which guides the movement of the piston member 22 in an axial direction of the rotating shaft 5; an engagement member 24 which functions as an engagement element 8 and which is fixed to the casing member 23; and spring members 10 which urge the piston member 22 in a clamping direction using the casing member 23 as a base.

The casing member 23 (cylinder element 7) is a circular lid-shaped member having a flange portion and a hole through which the rotating shaft 5 extends at the center. The casing member 23 is detachably fixed to an end face of the housing 3 at a side opposite the end face to which the circular table 16 is attached. More specifically, a step portion is formed in the end face of the housing 3 at the side opposite the circular table 16, and an end portion (flange portion) of the casing member 23 is attached to the housing 3 while being fitted in the step portion of the circular table 16. The casing member 23 and the housing 3 are fixed to each other by a plurality of screw members 25 arranged along a circumference centered on the axial line of the rotating shaft 5. A ring-shaped groove 34 which is centered on the axial line of the rotating shaft 5 is formed in an inner surface of the casing member 23, and the piston member 22 is accommodated in the groove 34.

The piston member 22 (clamp element 6) is a ring-shaped member which is L-shaped in cross section, and is fitted in the ring-shaped groove 34 in the casing member 23 such that the piston member 22 is slidable in the axial direction the rotating shaft 5. More specifically, an outer peripheral surface and an inner peripheral surface of the piston member 22 are guided by inner surfaces of the groove 34 formed in the casing member 23, and the piston member 22 is slidable in the axial direction of the rotating shaft 5. In addition, an outer peripheral portion of the piston member 22 in a radial direction thereof projects toward the clamp disc 11 in the axial direction of the rotating shaft 5, and is provided with a pressing portion 9a which applies a pressing force to the clamp disc 11. A portion of the piston member 22 positioned inside the above-mentioned projecting portion in the radial direction has a stepped shape such that an end face 9 which faces the clamp disc 11 is positioned farther from the clamp disc 11 (closer to the casing member 23) than the above-described pressing portion 9a in the axial direction of the rotating shaft 5. The engagement member 24, which functions as the engagement element 8, is accommodated in the step portion.

Similar to the above-described members, the engagement member 24 (engagement element 8) is also a ring-shaped member. The engagement member 24 includes a fixed portion which is fixed to the casing member 23, and is shaped such that an outer peripheral portion of the engagement member 24 positioned outside the fixed portion projects toward the piston member 22. The engagement member 24 extends to an area of the groove 34 in the casing member 23 in the radial direction (radial direction of the rotating shaft 5). The extending portion has an engagement surface 14 which faces the end face 9 of the step portion of the piston member 22. The position of the engagement surface 14 in the axial direction of the rotating shaft 5 is set to a position where the engagement surface 14 does not obstruct the operation of pressing the clamp disc 11 performed by the clamp element 6. More specifically, in the state in which in the clamp device 2 is attached to the rotary circular table apparatus 15, when the piston member 22 is moved toward the clamp disc 11, the engagement surface 14 of the engagement member 24 approaches the end face 9 of the step portion of the piston member 22. However, since the piston member 22 and the clamp disc 11 come into contact with each other first, the engagement member 24 and the piston member 22 do not come into contact with each other and a small gap is provided therebetween even in a clamped state.

The outer peripheral surface of the engagement member 24 is in contact with the inner peripheral surface of the projecting portion of the piston member 22. Thus, sliding of the piston member 22 in the axial direction of the rotating shaft 5 is guided not only by the groove 34 in the casing member 23 but also by the outer peripheral surface of the engagement member 24. The engagement member 24 is fixed to the casing member 23 by a plurality of screw members arranged on an inner peripheral portion of the engagement member 24 along a circumferential direction thereof.

The spring members 10 are compression springs provided for urging the piston member 22 against the clamp disc 11, and are arranged between the casing member 23 and the piston member 22 along a circumference centered on the axial line of the rotating shaft 5. The spring members 10 normally press the piston member 22 against the clamp disc 11, so that the clamp disc 11 is clamped between the piston member 22 and the clamp surface 12 of the housing 3 and the circular table 16 is set to a clamped state. An unclamping means 13 for cancelling the clamped state is also provided in which working fluid (pressure oil, compressed air, etc.) is supplied from a fluid port 26 formed in the housing 3 to a pressure chamber 28 provided between the piston member 22 and the engagement member 24 through a fluid path 27 formed in the casing member 23.

In an indexing operation of the circular table 16, the working fluid (pressure oil) is supplied to the pressure chamber 28 so that the piston member 22 is moved away from the clamp disc 11 against the urging force applied by the spring members 10. Thus, the pressing force applied to the clamp disc 11 is eliminated. As a result, the rotary circular table apparatus 15 is set to an unclamped state in which the circular table 16 (rotating shaft 5) is rotatable. Then, the circular table 16 is rotated to a desired angle by the drive means, and the process of supplying the working fluid is stopped so that the piston member 22 is moved toward the clamp disc 11 by the restoring force of the spring members 10. As a result, the state in which the clamp disc 11 is pressed by the pressing portion 9a (clamped state) is reestablished, so that the circular table 16 is retained at the desired indexing position.

In this example, the working fluid can also be supplied to a pressure chamber 29 provided between the casing member 23 and the piston member 22 through a fluid path 32. Thus, an urging force (fluid pressure) generated by the working fluid can be applied to the piston member 22 in addition to the urging force (spring force) applied by the spring members 10. Accordingly, the clamping force can be increased and the clamping tightness can be ensured.

Figure 2:
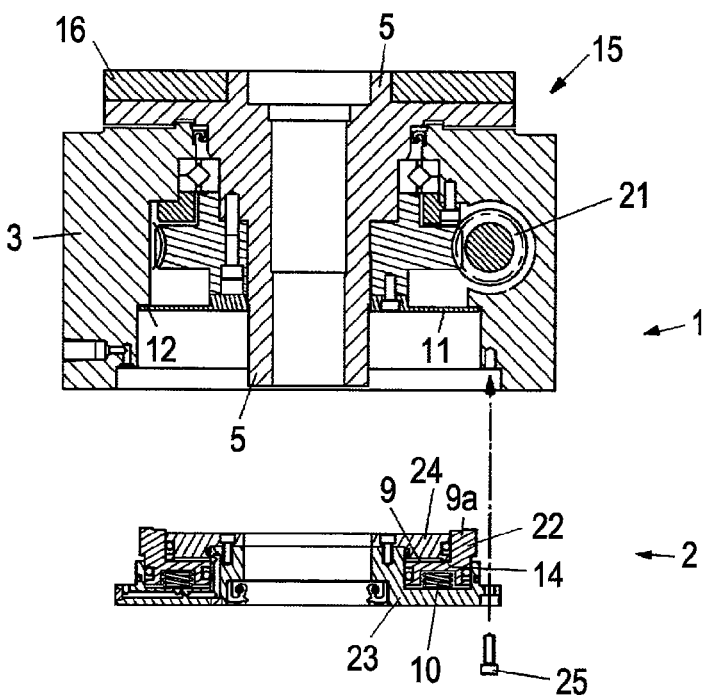
FIG. 2 is a sectional view illustrating the state in which a clamp device 2 is detached from the rotation indexing apparatus 1.

FIG. 2 shows the state in which the clamp device 2 according to the present invention is detached from the rotary circular table apparatus 15. The clamp device 2 can be detached from the rotary circular table apparatus 15 simply by removing the screw members 25 with which the casing member 23 is fixed to the housing 3. When the screw members 25 are removed, not only the casing member 23 but also the piston member 22, the engagement member 24, and the spring members 10 can be simultaneously detached from the housing 3 together as a unit.

At this time, a displacement of the piston member 22 toward the clamp disc 11 is restricted by the engagement member 24 fixed to the casing member 23. Therefore, when the casing member 23 is detached from the housing 3, the piston member 22 is also detached from the housing 3 without falling therefrom in such a state that the piston member 22 is attached to the casing member 23. When the clamp device 2 is detached from the housing 3, the piston member 22 is pressed against the engagement surface 14 of the engagement member 24 by the urging force applied by the spring members 10. Therefore, the piston member 22 is prevented from moving freely and there is no risk that the work efficiency will be degraded by free movement of the piston member.

Figures 3, 4:
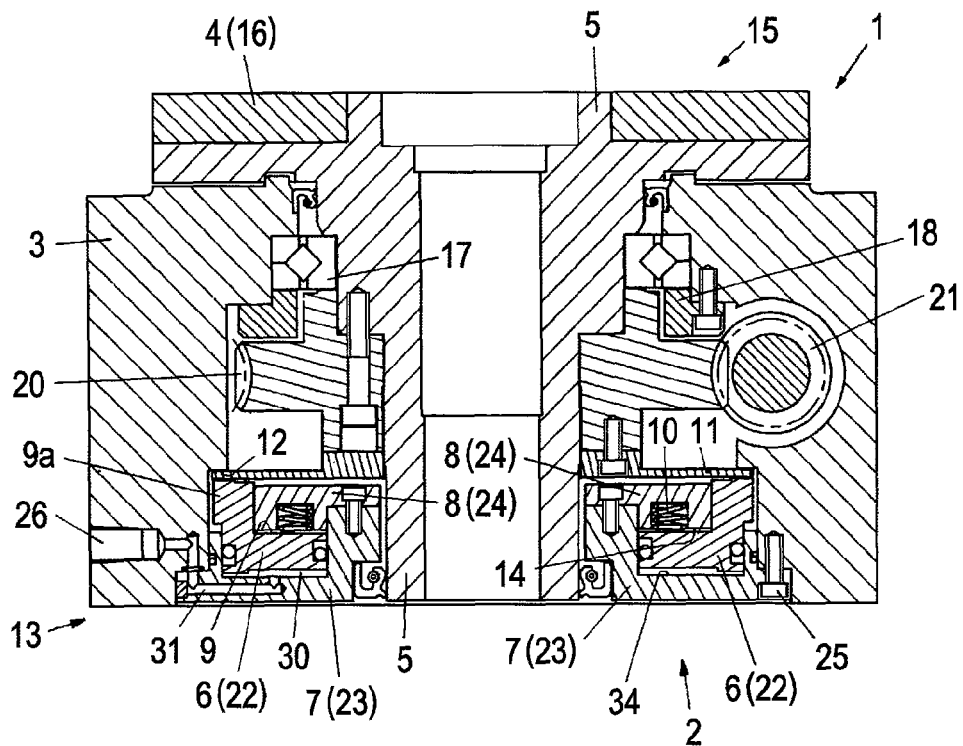
FIG. 3 is a sectional view illustrating the entire body of a rotation indexing apparatus 1.
FIG. 4 is a sectional view illustrating the state in which a clamp device 2 is detached from the rotation indexing apparatus 1.

FIG. 3 is a clamp device 2 of a normally unclamped type according to another embodiment of the present invention. In this embodiment, compression springs used as the spring members 10 are interposed between the engagement member 24 and the piston member 22. The compression springs normally urge the piston member 22 in a direction away from the clamp disc 11, and the piston member 22 is normally separated from the clamp disc 11. A pressure chamber 30 is formed between the piston member 22 and the casing member 23, and a fluid path 31 formed in the casing member 23 communicates with the pressure chamber 30. Working fluid used for clamping the clamp disc 11 is supplied to the fluid path 31, so that the piston member 22 is moved toward the clamp disc 11 by the pressure of the working fluid against the spring force applied by the compression springs. As a result, the piston member 22 presses the clamp disc 11 and clamps the clamp disc 11 in cooperation with the clamp surface 12 of the housing 3.

FIG. 4 shows the state in which the clamp device 2 according to the present invention shown in FIG. 3 is detached from the rotary circular table apparatus 15. Also in this embodiment, the clamp device 2 can be detached from the rotary circular table apparatus 15 simply by removing the screw members 25 with which the casing member 23 is fixed to the housing 3. When the screw members 25 are removed, not only the casing member 23 but also the piston member 22, the engagement member 24, and the spring members 10 (compression springs) can be detached from the housing 3 as a unit. When the clamp device 2 is detached from the housing 3, the piston member 22 is pressed against the casing member 23 by the urging force applied by the spring members 10. Therefore, the piston member 22 is prevented from moving freely and there is no risk that the work efficiency will be degraded by free movement of the piston member.

Figure 5:
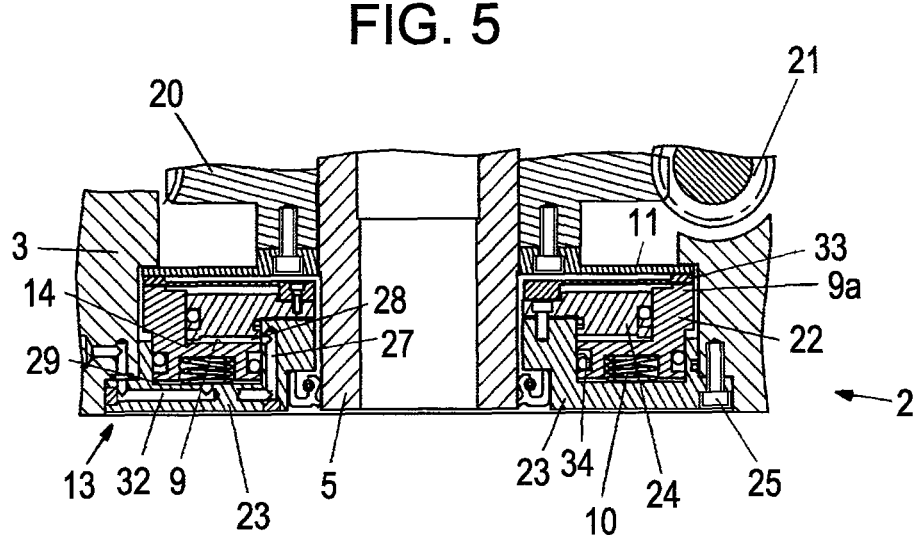
FIG. 5 is a detailed sectional view of a clamp device 2.

FIG. 5 shows a modification of the present invention in which a second clamping member 33 is provided in addition to the piston member 22 which corresponds to the clamp element 6 according to the present invention. The piston member 22 presses the clamp disc 11 with the second clamping member 33 interposed therebetween. The second clamping member 33 is an elastically deformable disc-shaped member, and an inner peripheral portion of the second clamping member 33 in the radial direction thereof is fixed to the engagement member 24, which is formed integrally with the casing member 23. The second clamping member 33 is elastically deformed by the pressing force applied by the pressing portion 9a of the piston member 22, and an outer peripheral portion (clamp surface) of the second clamping member 33 in the radial direction thereof is moved so as to clamp the clamp disc 11 in cooperation with the clamp surface 12 of the housing 3.

In this example, the second clamping member 33, which directly clamps the clamp disc 11, is fixed to the engagement element 8 and is not rotatable with respect to the housing 3. Therefore, even when rattling occurs between sliding guide surfaces of the piston member 22 and the ring-shaped groove 34, the second clamping member 33 does not rattle and the clamping state of the clamp disc 11 is not affected by the rattling of the sliding guide surfaces. Therefore, stable positioning performance (indexing accuracy of the indexing apparatus) can be ensured for a long period of time. In this structure, the second clamping member 33 may be attached to the engagement member 24 as shown in FIG. 5 or to the casing member 23 so that the second clamping member 33 can also be detached from the apparatus together with the casing member 23 and other members as a unit. Thus, according to the present invention, members included in the unit are not limited to the casing member 23, the piston member 22, the engagement element 8, and the spring members 10 as in the above-described example, and other members may also be included. However, in the example shown in FIG. 5, the second clamping member 33 may also be attached to the housing 3.

Figure 6:
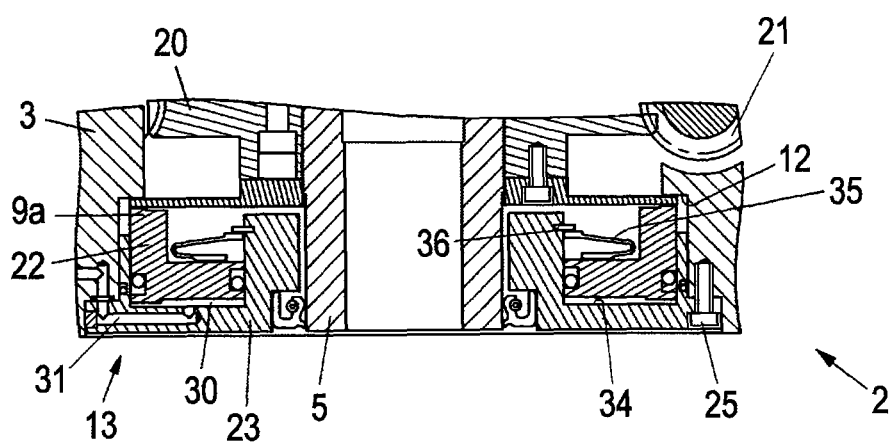
FIG. 6 is a detailed sectional view of a clamp device 2.

FIG. 6 shows another modification of the present invention in which a stopper ring 36 which functions as the engagement element 8 is provided at an upper section of a shaft portion of the casing member 23, and a bellows-shaped bellows spring 35 is used as the spring member 10 in the above-described clamp device 2 of the normally unclamped type. Thus, the structure of the clamp device 2 is simplified. In this example, the bellows spring 35 is placed between the stopper ring 36 and the piston member 22. The bellows spring 35 normally urges the piston member 22 in a direction away from the clamp disc 11, and the piston member 22 is normally separated from the clamp disc 11. A pressure chamber 30 is formed between the piston member 22 and the casing member 23, and a fluid path 31 formed in the casing member 23 communicates with the pressure chamber 30. Working fluid used for clamping the clamp disc 11 is supplied to the pressure chamber 30, so that the piston member 22 is moved toward the clamp disc 11 by the pressure of the working fluid against the spring force applied by the bellows spring 35. As a result, the piston member 22 presses the clamp disc 11 and clamps the clamp disc 11 in cooperation with the clamp surface 12 of the housing 3. In this example, a single bellows spring 35 is used as the spring member 10. However, two or more disc springs or coil springs may also be used in place of the bellows spring 35.

In the examples shown in FIGS. 1, 3, and 5, the engagement element 8 (engagement member 24) extends over the entire area of the ring-shaped groove 34 in the cylinder element 7 (casing member 23) in the radial direction of the rotating shaft 5. However, as in this example, the engagement element 8 (stopper ring 36) may also extend over a part of the area of the ring-shaped groove 34 to restrict the movement of the clamp element 6 (piston member 22) toward the clamp disc 11. In addition, the engagement element 8 is not limited to an element which restricts the movement of the clamp element 6 by coming into direct contact with the clamp element 6. For example, as in this example, the movement of the clamp element 6 may also be restricted using an additional member (the bellows spring 35 in this example) provided between the clamp element 6 and the engagement element 8.

In the above-described embodiments, each of the clamp element 6 and the cylinder element 7 is composed of a single member. However, the present invention is not limited to this, and each of the clamp element and the cylinder element may also be formed by combining a plurality of members together.

INDUSTRIAL APPLICABILITY

The present invention can be applied to various braking apparatuses that apply a brake on a rotating shaft or the like by clamping a disc. In the above-described embodiments, the rotary circular table apparatus 15 is described as an example of the rotation indexing apparatus 1 to which the present invention is applied. However, the present invention is not limited to this, and may also be applied to, for example, apparatuses described in Japanese Unexamined Patent Application Publication Nos. 5-212646 and 3-178709, that is, an apparatus (main shaft head) which supports and turns a device (spindle unit) which rotates a spindle to which a tool is attached, or a section (apparatus) of a machine tool which rotates the main shaft head supporting the spindle unit around an axial line parallel to the Z axis of the machine tool. In the former case, the spindle unit corresponds to the rotary drive target member. In the latter case, the main shaft head corresponds to the rotary drive target member.

The invention claimed is:

1. A clamp device for a rotation indexing apparatus for a machine tool, the rotation indexing apparatus including
a rotating shaft which is rotatably provided in a housing and to which a rotary drive target member is fixed at an end of the rotating shaft,
a clamp disc which is attached to the rotating shaft such that the clamp disc is not rotatable with respect to the rotating shaft, and
the clamp device which applies a pressing force to the clamp disc and clamps the clamp disc between the clamp device and a clamp surface of the housing, thereby setting the rotary drive target member to a clamped state,
wherein the clamp device comprises:
a cylinder element which includes a flange portion and which is detachably fixed to the housing such that an end face of the flange portion that faces the housing and an end face of the housing at a side opposite the rotary drive target member are in contact with each other, the cylinder element having a ring-shaped groove that is formed so as to be centered on an axial line of the rotating shaft;
a plurality of screw members used to fix the cylinder element to the housing, the screw members being inserted through the flange portion of the cylinder element from a side of the flange portion that is opposite the housing and screwed into screw holes formed in the housing so as to open in the end face of the housing that is in contact with the flange portion of the cylinder element;
a clamp element which is inserted in the ring-shaped groove in the cylinder element such that the clamp element is slidable in an axial direction of the rotating shaft, the clamp element having a pressing portion for applying a pressing force to the clamp disc in a part of an end face which faces the clamp disc in the axial direction of the rotating shaft;
an engagement element which is fixed to the cylinder element at a position inside from the ring-shaped groove in the cylinder element in a radial direction of the rotating shaft and extends into an area of the ring-shaped groove, the engagement element disposed between the clamp disc and the cylinder element in an engagement direction, and a portion of the clamp element placed between the engagement element and the cylinder element; and
a spring member disposed between the clamp element and the cylinder element, said spring member configured to urge the clamp element in a clamping direction, which is a direction toward the clamp disc.

2. The clamp device for the rotation indexing apparatus for the machine tool according to claim 1,
wherein the clamp device is a clamp device of a normally clamped type in which the cylinder element is normally urged in the clamping direction by the spring member, and
wherein the engagement element includes an engagement surface which faces the end face of the clamp element and which is disposed at a position where the engagement surface does not obstruct an operation of pressing the clamp disc performed by the clamp element.

3. A clamp device for a rotation indexing apparatus for a machine tool, the rotation indexing apparatus comprising:
a rotating shaft rotatably provided in a housing and to which a rotary drive target member is fixed at an end of the rotating shaft;
a clamp disc attached to the rotating shaft such that the clamp disc is not rotatable with respect to the rotating shaft; and
the clamp device applies a pressing force to the clamp disc and clamps the clamp disc between the clamp device and a clamp surface of the housing, thereby setting the rotary drive target member to a clamped state, wherein the clamp device comprises:

a cylinder element comprising a flange portion configured to detachably fix to the housing such that an end face of the flange portion that faces the housing and an end face of the housing at a side opposite the rotary drive target member are in contact with each other, and a ring-shaped groove configured to be centered on an axial line of the rotating shaft;

a plurality of screw members configured to fix the cylinder element to the housing, the screw members being inserted through the flange portion of the cylinder element from a side of the flange portion that is opposite the housing and screwed into screw holes formed in the housing so as to open in the end face of the housing that is in contact with the flange portion of the cylinder element;

a clamp element inserted in the ring-shaped groove in the cylinder element such that the clamp element is slidable in an axial direction of the rotating shaft, the clamp element having a pressing portion for applying a pressing force to the clamp disc in a part of an end face which faces the clamp disc in the axial direction of the rotating shaft;

an engagement element which is fixed to the cylinder element at a position inside from the ring-shaped groove in the cylinder element in a radial direction of the rotating shaft and extends into an area of the ring-shaped groove, the engagement element disposed between the clamp disc and the cylinder element in an engagement direction, and a portion of the clamp element placed between the engagement element and the cylinder element; and a spring member disposed between the clamp element and the engagement element, said spring member configured to urge the clamp element in an unclamping direction, which is a direction away from the clamp disc.

* * * * *